T. J. MARTIN.
ANTIRATTLING DEVICE FOR AUTO HOODS.
APPLICATION FILED FEB. 17, 1920.

1,365,932.

Patented Jan. 18, 1921.

Inventor
T. J. Martin

By D. Swift
His Attorneys

UNITED STATES PATENT OFFICE.

TRUMAN J. MARTIN, OF ALLENTOWN, PENNSYLVANIA.

ANTIRATTLING DEVICE FOR AUTO-HOODS.

1,365,932.   Specification of Letters Patent.   Patented Jan. 18, 1921.

Application filed February 17, 1920. Serial No. 359,308.

*To all whom it may concern:*

Be it known that I, TRUMAN J. MARTIN, a citizen of the United States, residing at Allentown, in the county of Lehigh, State of Pennsylvania, have invented a new and useful Antirattling Device for Auto-Hoods; and I do hereby declare the following to be a full, clear, and exact description of the invention such as will enable others skilled in the art to which it appertains to make and use the same.

The invention relates to antirattling devices for automobile hoods and has for its object to provide pliable metallic ribbons which may be applied to the flange engaging ends of the sections of the hood for engagement with the radiator flange, and also with the body flange of the automobile, said ribbons being provided with a series of balls which engage the flanges and reduce the frictional engagement of the hood ends to a minimum, thereby preventing rattling or vibration of the hood.

A further object is to provide an antirattling ribbon for the engaging ends of automobile hoods, said ribbon comprising strips formed from a pliable metallic material which strips are provided with apertures through which the convex surfaces of balls project for engagement with contacting surfaces which normally contact with the hood.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the forward end of a conventional form of automobile, showing the hood open and the antirattling ribbons attached thereto.

Fig. 2 is a perspective view of a portion of one of the ribbons and also a portion of the end of the hood.

Fig. 3 is a sectional view through the ribbon, a portion of the hood and the ball engaging flange of the automobile body.

Fig. 4 is a sectional view taken on line 4—4 of Fig. 3.

Referring to the drawings, the numeral 1 designates a conventional form of automobile and 2 the radiator thereof. Radiator 2 is provided with a hood engaging flange 3, there being a similar flange 4 carried by the body 5 of the automobile. The ends of the hood of the hinged sections 6 when said sections are in closed position engage the flanges 3. Where there is no antirattling device used, as the automobile vibrates incident to passing over rough ground, the sections 6 also vibrate, which vibration causes an objectionable rattel of the hood, which vibrates on the flanges 3 and 4. To overcome this difficulty ribbons 7 are secured by means of rivets or the like 8 to the marginal edges of the sections 6. Ribbons 7 are formed from pliable metallic strips 9 and 10 which strips are provided with registering apertures 11, through which apertures the convexed sides 12 of balls 13 project, said balls being held in position between the strips 9 and 10. Convexed sides 12 of the balls 13 engage the flanges 3 and 4 and also the ends of the hood sections 6 to which the ribbons are secured, thereby reducing the engaging surfaces to a minimum and preventing rattling of the sections 6 when said sections are in closed position and the automobile is moving over rough ground or vibrating incident to the running of the motor. The pliable metallic strip 9 has its marginal edges bent upwardly and inwardly to form flanges 14 which overlie the longitudinal marginal edges of the strip 10 thereby holding said strips 9 and 10 together and also hold the balls 13 against displacement.

From the above it will be seen that an antirattling ribbon is provided for automobiles hoods which may be easily and quickly applied and one wherein the engaging of the surface of the hood is reduced to a minimum. However it is to be understood that the antirattling ribbon may be applied to the various parts of an automobile, for instance to the door, or windows.

It is to be understood that the antirattling ribbon may be used in connection with any form of holding down bolts for the hood.

The invention having been set forth what is claimed as new and useful is:—

1. An antirattling device for automobile hoods, said device comprising ribbons secured to the engaging surfaces at the ends of the hood, said ribbons comprising a pair of strips formed from pliable material, a series of balls disposed between said strips, said balls having their convex surfaces protruding above and below the strips through registering apertures in said strips, the marginal edges of one of said strips being bent upwardy and over the other strip whereby said strips are held together.

2. An antirattling device adapted to be disposed between engaging surfaces of members and maintain said surfaces in spaced relation to each other, said device comprising a ribbon carried by one of the adjacent members and secured thereto, said ribbon comprising a pair of strips formed from pliable material, a plurality of balls disposed between said strips, said balls having their convexed surfaces protruding beyond the outer faces of the strips through registering apertures in said strips, and means for securing said strips together.

3. An antirattling device adapted to be disposed between engaging surfaces of members and maintain said surfaces in spaced relation to each other, said device comprising a ribbon carried by one of the adjacent members, said ribbon comprising a pair of strips formed from pliable material, and a plurality of balls disposed between said strips, said balls having their convexed surfaces protruding beyond the outer faces of the strips through registering apertures in said strips, the marginal edges of one of said strips being bent upwardly and over the other strip whereby said strips are held together.

In testimony whereof I have signed my name to this specification in the presence of two subscribing witnesses.

TRUMAN J. MARTIN.

Witnesses:
HORACE HEYDT,
HARVEY H. STECKEL.